(12) United States Patent
Kerbler et al.

(10) Patent No.: US 11,390,394 B2
(45) Date of Patent: Jul. 19, 2022

(54) NACELLE FOR AN AIRCRAFT TURBOJET ENGINE PROVIDED WITH A DEVICE FOR DETECTING DEFORMATION OF ITS MOVABLE STRUCTURE

(71) Applicant: Safran Nacelles, Gonfreville l'Orcher (FR)

(72) Inventors: Olivier Kerbler, Gonfreville l'Orcher (FR); Laurent Georges Valleroy, Gonfreville l'Orcher (FR); Corentin Hue, Gonfreville l'Orcher (FR); Alexis Heau, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 265 days.

(21) Appl. No.: 16/467,718

(22) PCT Filed: Dec. 1, 2017

(86) PCT No.: PCT/FR2017/053352
§ 371 (c)(1),
(2) Date: Jun. 7, 2019

(87) PCT Pub. No.: WO2018/104632
PCT Pub. Date: Jun. 14, 2018

(65) Prior Publication Data
US 2020/0031485 A1 Jan. 30, 2020

(30) Foreign Application Priority Data
Dec. 7, 2016 (FR) ..................................... 16/62073

(51) Int. Cl.
*B64D 29/06* (2006.01)
*F02K 1/70* (2006.01)
(Continued)

(52) U.S. Cl.
CPC ......... *B64D 29/06* (2013.01); *B64D 45/0005* (2013.01); *B64C 9/38* (2013.01);
(Continued)

(58) Field of Classification Search
CPC ... F02K 1/70; F02K 1/72; F02K 1/763; F02K 1/625; B64D 29/06; B64D 45/0005; F01D 17/02; F01D 21/003
See application file for complete search history.

(56) References Cited

U.S. PATENT DOCUMENTS 4,827,248 A * 5/1989 Crudden ................ B64D 29/00
244/11 OB
6,039,747 A * 3/2000 Shturman ...... A61B 17/320758
606/159

(Continued)

FOREIGN PATENT DOCUMENTS

| EP | 1972548 | 9/2008 |
|---|---|---|
| FR | 3019229 | 10/2015 |
| GB | 2510635 | 8/2014 |

OTHER PUBLICATIONS

International Search Report for International Application PCT/FR2017/053352, dated Mar. 5, 2018.

*Primary Examiner* — Andrew H Nguyen
(74) *Attorney, Agent, or Firm* — Burris Law, PLLC

(57) ABSTRACT

A nacelle for an aircraft turbojet engine includes a thrust-reversing device with a fixed structure and a movable structure translatably movable along an axis substantially parallel with a longitudinal axis of the nacelle between a retracted position in which it provides aerodynamic continuity with the fixed structure of the nacelle during operation of the nacelle with forward thrust and a deployed position in which it opens a passage intended for the circulation of a diverted secondary air flow during operation of the nacelle with reverse thrust. The nacelle includes at least one position (Continued)

sensor configured and arranged in the nacelle for detecting a deformation of the movable structure exceeding a permitted predetermined deformation threshold.

18 Claims, 5 Drawing Sheets

(51) Int. Cl.
*B64D 45/00* (2006.01)
*B64C 9/38* (2006.01)
*F02K 1/72* (2006.01)
*F02K 1/76* (2006.01)

(52) U.S. Cl.
CPC ............... *F02K 1/72* (2013.01); *F02K 1/763* (2013.01); *F05D 2230/60* (2013.01)

(56) References Cited

U.S. PATENT DOCUMENTS

| | | | |
|---|---|---|---|
| 10,040,563 B1* | 8/2018 | Pinto | F02K 1/09 |
| 2002/0157377 A1 | 10/2002 | Ahrendt | |
| 2004/0060371 A1* | 4/2004 | Barkhoudarian | F01D 21/003 |
| | | | 73/862.331 |
| 2010/0212286 A1* | 8/2010 | West | F02K 1/32 |
| | | | 60/226.2 |
| 2016/0033358 A1* | 2/2016 | Hockaday | G01M 15/14 |
| | | | 356/32 |
| 2017/0342942 A1* | 11/2017 | Smith | G01M 15/14 |

\* cited by examiner

NACELLE FOR AN AIRCRAFT TURBOJET ENGINE PROVIDED WITH A DEVICE FOR DETECTING DEFORMATION OF ITS MOVABLE STRUCTURE

CROSS-REFERENCE TO RELATED APPLICATIONS

This application is a National Phase Application under 35 U.S.C 371 of International Application No. PCT/FR2017/053352, filed on Dec. 1, 2017, which claims priority to and the benefit of FR 16/62073 filed on Dec. 7, 2016. The disclosures of the above applications are incorporated herein by reference.

FIELD

The present disclosure relates to a nacelle for an aircraft turbojet engine.

BACKGROUND

The statements in this section merely provide background information related to the present disclosure and may not constitute prior art.

An aircraft is propelled by several turbojet engines each housed in a nacelle. The propulsion unit constituted by a turbojet engine and the nacelle that receives it is represented in FIG. 1.

The propulsion unit 1 comprises a nacelle 3 supporting a turbojet engine 5. The propulsion unit 1 is connected to the fuselage of the aircraft (not shown) for example with a mast 7 intended to be suspended under a wing of the aircraft.

The nacelle 3 generally has a tubular structure comprising an upstream section 9 defining an air inlet upstream of the turbojet engine 5, a middle section 11 intended to surround a fan of the turbojet engine, a downstream section 13 comprising an outer cowling 15 capable of accommodating a thrust reverser device and intended to surround the combustion chamber of the turbojet engine, and generally terminates in an ejection nozzle whose outlet is located downstream of the turbojet engine.

This nacelle accommodates the turbojet engine 5 which may be of the bypass type, adapted to generate, via the blades of the rotating fan, a hot air flow (also called primary flow), coming from the combustion chamber of the turbojet engine, and a cold air flow (secondary flow) which circulates outside the turbojet engine through a flow path, also called annular channel, formed between a fairing of the turbojet engine and an inner wall of the outer cowling 15 of the nacelle. The two air flows are ejected from the turbojet engine from the rear of the nacelle.

The thrust reverser device is, during the landing of the aircraft, intended to improve the braking capability thereof by forwardly redirecting at least one portion of the thrust generated by the turbojet engine.

In this phase, the thrust reverser device obstructs the cold air flow path and directs the latter towards the front of the nacelle, thereby generating a counter-thrust which is added to the braking of the wheels of the aircraft.

Carrying out this reorientation of the cold flow can vary depending on whether the thrust reverser device is of the door type or is of the cascade type.

However, in all cases, the outer cowling 15 comprises a movable structure displaceable between, on the one hand, a deployed position in which it opens a passage intended for the diverted flow in the nacelle, and on the other hand, a retraction position in which it closes this passage.

As regards the thrust reverser devices with cascade vanes, two types of thrust reverser devices with cascade vanes are known from the prior art.

A first thrust reverser device with cascade vanes of a "fixed cascade" type is represented in FIGS. 2 and 3.

FIGS. 2 and 3 are longitudinal sectional views of the nacelle, centered on the middle and downstream sections of the nacelle, the nacelle being illustrated respectively in direct jet operation (FIG. 2) and in reverse jet operation (FIG. 3).

The movable structure of the nacelle comprises two substantially hemi-cylindrical half-cowls (forming the outer cowling 15 shown in FIG. 1).

Each half-cowl is movable in translation along upper guiding rails (conventionally called "12 O'clock rails" because of their positions at the top of the nacelle) fixed in the nacelle and anchored on either side of the mast 7 (or strut) shown in FIG. 1, and along a lower guiding rail (conventionally called "6 O'clock rail" because of its position in the lower portion of the nacelle) also fixed in the nacelle.

The two hemi-cylindrical half-cowls form a thrust reverser cowl 17. The thrust reverser cowl is substantially annular. In the retracted position, corresponding to a direct jet operation of the nacelle, the thrust reverser cowl 17 provides an external aerodynamic continuity with a fixed structure of the nacelle and covers annular cascade vanes 19 associated to thrust reverser flaps 21.

In a known manner, the cascade vanes 19 are attached to a fan casing 23 of the turbojet engine, using a fixed front frame 27.

The thrust reverser flaps 21 form, for their part, blocking doors which can be activated by the sliding of the cowl causing a closure of the flow path V downstream of the cascades, as illustrated in FIG. 3, so as to improve the reorientation cold air flow F.

When the thrust reverser cowl 17 is displaced downstream of the nacelle until reaching a deployed position corresponding to an operation of the nacelle in reverse jet in which it uncovers the cascade vanes 19, it creates a passage in the nacelle for the circulation of a diverted secondary air flow.

The reorientation of the air flow is performed via the cascade vanes 19 associated to the thrust reverser flaps 21, the cowl 17 having a simple sliding function aiming at uncovering or covering these cascade vanes.

A second thrust reverser device with cascade vanes is of the "translating cascade" type, which device is represented in FIGS. 4 and 5 referred to herein.

FIGS. 4 and 5 are longitudinal sectional views of the nacelle, centered on the middle and downstream sections of the nacelle, the nacelle being illustrated respectively in direct jet operation and in reverse jet operation.

As illustrated in FIG. 4, cascade vanes 29 are enclosed in direct jet operation within an envelope defined by the annular space E formed by a fan cowl 25 and the fan casing 23 of the turbojet engine.

The cascade vanes 29 are supported in a known manner at their upstream end by a movable front frame 31 and at their downstream end by a movable rear frame 33, secured to an upstream edge 35 of a thrust reverser cowl 37.

As for the thrust reverser device with fixed cascades illustrated in FIGS. 2 and 3, the thrust reverser cowl 37 is substantially annular and is formed by two hemi-cylindrical half-cowls. The two hemi-cylindrical half-cowls form the outer cowling 15 shown in FIG. 1. Each half-cowl is movable in translation along upper rails (12 O'clock rail) fixed in the nacelle and anchored on either side of the mast, and along a lower rail (6 O'clock rail) fixed in the nacelle. Nonetheless, the movable structure of the nacelle comprises herein the thrust reverser cowl 37 and the translating cascade vanes 29 which are secured to the thrust reverser cowl 37.

In the retracted position, corresponding to a direct jet operation of the nacelle (FIG. 4), the thrust reverser cowl 37 of the movable structure provides an aerodynamic continuity with the fixed structure of the nacelle.

Moreover, thrust reverser flaps 39 are secured to the rear frame 33 of the cascade vanes 29. In direct jet operation of the nacelle, such as that represented in FIG. 4, the flaps are in a position called closed position.

According to this type of thrust reverser device with translating cascades, the cascade vanes 29 are movable and translate with the thrust reverser cowl 37 during the thrust reversal phases.

FIG. 5 illustrates the nacelle in the reverse jet position. In such a position, the cascade vanes 29 and the thrust reverser cowl 37 are moved back downstream of the nacelle. When the movable structure is displaced downstream of the nacelle until reaching a deployed position corresponding to an operation of the nacelle in reverse jet, the movable structure creates a passage in the nacelle intended for the circulation of a diverted secondary air flow F.

The cascade vanes 29 are downstream of the envelope formed by the fan cowl 25 and the fan casing 23, thus becoming operational to enable at least one portion of the air flow F, passing through the flow path V, to escape from the nacelle and to be redirected upstream of the nacelle.

In the reverse jet operation of the nacelle, such as that represented in FIG. 5, the thrust reverser flaps 39 have pivoted relative to the direct jet operation of the nacelle. These flaps are then in a position called open position and at least partially obstruct the flow path V for circulating the air flow F. They contribute to the redirection of at least one portion of the air flow F through the cascade vanes 29.

Regardless of the retained type of thrust reverser device with (fixed or translating) cascades, the displacement of the movable structure, a structure comprising the single thrust reverser cowl when the thrust reverser device is of the fixed cascade type or comprising the thrust reverser cowl and the translating cascades when the thrust reverser device is of the translating cascade type, is obtained thanks to the activation of an actuation system comprising a set of hydraulic, pneumatic or electric actuators. These actuators are distributed over the circumference of the nacelle and typically have a first end secured to the fixed structure of the nacelle and a second end secured to the movable structure of the nacelle. A known configuration consists of two actuators disposed in an upper area located proximate to the upper rails (12 O'clock rail) and two actuators disposed in a lower area located proximate to the lower rail (6 O'clock rail).

The actuators of the thrust reverser cowl are subjected to significant stresses during each actuation occurring during the activation of the thrust reverser device.

These stresses can, potentially, cause several damages on these actuators such as, in particular, a rupture of the tube of one or more of the actuators of the thrust reverser cowl, a loss of connection between one or more of these actuators and the movable structure of the nacelle, a breakage of the gear set of one or more of these actuators, a breakage which may cause a partial loss of the force path between the fixed and movable structures.

When one or more of these damages occur on one of the actuators of the thrust reverser device, the thrust reverser device, however, remains operational because the forces are taken on by the actuators which are sound.

Nonetheless, the resumption of the forces by the actuators that are sound ultimately causes a deformation of the movable structure, which deformation is detectable only during a thorough check-up of the nacelle. Thus, the aircraft can continue to fly as long as no thorough check-up of the nacelle is operated.

However, the movable structure of the nacelle can be further deformed during particular events such as a forced landing for example, due to the poor distribution of forces at the level of the actuators.

In order to avoid such a deformation, the movable structure of the nacelle is currently oversized from a fatigue point of view, this in order to enable it to take on the forces generated by the loss of an actuator of the thrust reverser device, while avoiding the deformation thereof, in particular, during particular events.

This fatigue oversizing of the movable structure of the nacelle has the drawback that the thrust reverser cowl has a high mass.

SUMMARY

In one form of the present disclosure, a nacelle for an aircraft turbojet engine comprising a thrust reverser device is provided, said nacelle comprising:

a fixed structure, and a movable structure, displaceable in translation along an axis substantially parallel to a longitudinal axis of the nacelle, between a retracted position in which it provides an aerodynamic continuity with said fixed structure of the nacelle during an operation of the nacelle in direct jet and a deployed position in which it opens a passage intended for the circulation of a secondary air flow diverted during an operation of the nacelle in reverse jet, said nacelle comprising at least one position sensor, configured and arranged in the nacelle to detect a deformation of the movable structure exceeding an authorized predetermined deformation threshold.

Thus, equipping the nacelle with sensors configured and arranged in the nacelle to detect a deformation of the movable structure exceeding an authorized predetermined deformation threshold, detection of any event beyond the limits of the fatigue sizing of the structure is provided.

In case of detection of deformation of the movable structure, a maintenance operation aiming at inspecting and potentially repairing the actuators of the thrust reverser device and the movable structure may be provided.

Alternatively, the pilot may choose to limit the application of the maximum counter-thrust during a thrust reversal phase (for example by reducing the engine speed) following the detection of the deformation of the structure (taking into account that the pilot is aware of this deformation of the structure, which is not the case in the prior art).

Thus, via the detection of a deformation of the structure, it is now possible to act on the movable structure or on the application of the applicable load during a thrust reversal operation upstream of an irreversible deformation of the structure.

Henceforth, it is no longer desired, on the contrary of the prior art, to oversize the movable structure from a fatigue point of view.

By being thereby able to reduce the fatigue dimensioning of the movable structure, the mass of the movable structure is considerably reduced in comparison with the prior art.

According to features, which are all optional:

the position sensor comprises:

a detector, secured to the fixed structure of the nacelle, and a target, secured to the movable structure of the nacelle, the position sensor being further configured to send a signal to an external device when the target substantially faces the detector;

the position sensor is a proximity sensor whose detector is secured to the fixed structure of the nacelle and whose target is secured to the movable structure of the nacelle and is adapted to change the state of a magnetic field emitted by the detector when said target substantially faces said detector; this sensor is capable of detecting the position of the movable structure without any physical contact, which allows not wearing the structure in an area of high potential frictions and high speeds of displacement of the movable structure;

alternatively, the position sensor is an optical sensor whose detector is secured to the fixed structure of the nacelle and emits a luminous flux and whose target is secured to the movable structure of the nacelle and includes a reflector for reflecting said luminous flux; As for the proximity sensor, this sensor is capable of detecting the position of the movable structure without any physical contact, which allows not wearing the structure in an area of high potential frictions and high speeds of displacement of the movable structure;

according to another alternative, the position sensor is an electromechanical sensor whose detector is secured to the fixed structure of the nacelle and comprises a contact lever and whose target is secured to the movable structure of the nacelle and is designed to actuate said contact lever when said target substantially faces said detector;

in the nacelle, according to the present disclosure, the fixed structure comprises:

an upper system for guiding said movable structure, positioned proximate to a mast intended to connect said nacelle to an aircraft wing, and a lower system for guiding said movable structure, substantially diametrically opposite to said upper guiding system, and the movable structure comprises:

a set of cascade vanes, contained within an envelope defined by a fan cowl and by a fan casing of a turbojet engine during an operation of the nacelle in direct jet, a thrust reverser cowl, secured to said set of cascade vanes, a slide, designed to enable the displacement of said movable structure along the lower guiding system, said nacelle being remarkable in that the detector of the position sensor is mounted on at least one of said guiding systems, and in that the target is mounted on said slide.

the fixed structure further comprises a deflection edge, providing an aerodynamic line with a downstream portion of a fan casing of a turbojet engine, and the detector of said position sensor is mounted proximate to said deflection edge.

Alternatively, in the nacelle of the present disclosure the fixed structure comprises:

an upper system for guiding said movable structure, positioned proximate to a mast intended to connect said nacelle to an aircraft wing, and a lower system for guiding said movable structure, substantially diametrically opposite to said upper guiding system, and the movable structure comprises a thrust reverser cowl, displaceable in translation along an axis substantially parallel to a longitudinal axis of the nacelle, between a retracted position in which it provides an aerodynamic continuity with said fixed structure of the nacelle during an operation of the nacelle in direct jet and a deployed position in which it opens a passage intended for the circulation of a secondary air flow diverted during an operation of the nacelle in reverse jet, said nacelle being comprising a detector of a position sensor mounted on at least one of said guiding systems, and in that a target is mounted on said thrust reverser cowl, proximate to an upstream edge of said thrust reverser cowl;

the upper guiding system comprises two profiled guiding rails along the mast and in which the lower guiding system includes one single guiding rail, said nacelle being characterized in that it includes a detector on each rail of the upper guiding system and a detector on the rail of the lower guiding system.

According to another variant of the present disclosure, the fixed structure comprises:

an upper system for guiding said movable structure, positioned proximate to a mast intended to connect said nacelle to an aircraft wing, and a lower system for guiding said movable structure, substantially diametrically opposite to said upper guiding system, and the movable structure comprises:

a set of cascade vanes contained within an envelope defined by a fan cowl and by a fan casing of a turbojet engine during an operation of the nacelle in direct jet, a thrust reverser cowl secured to said set of cascade vanes, the nacelle further comprising a plurality of actuators designed to displace said movable structure during the activation thereof, the nacelle comprising a linear position sensor of the "LDT"«LVDT» or magnetostrictive type, positioned proximate to at least one of said actuators.

In some aspects of the present disclosure, a linear position sensor is positioned proximate to each of said actuators;

According to a variant common to all forms of the present disclosure, the nacelle includes at least one end-of-travel stop mounted on at least one system for guiding the movable structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
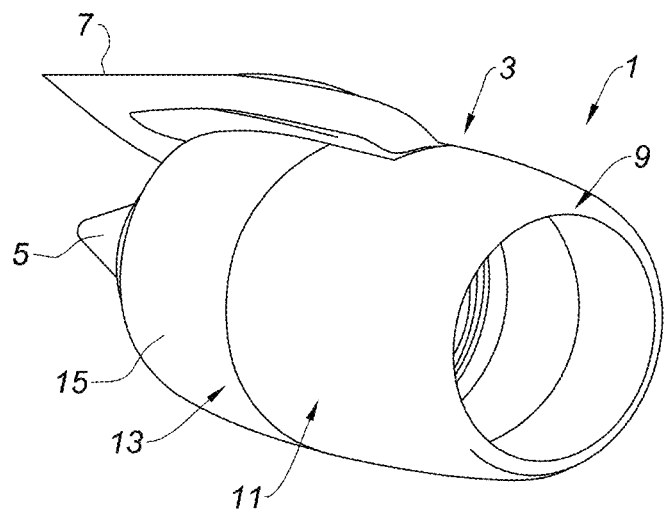
FIG. 1 represents a propulsion unit of the prior art.
Figure 2:
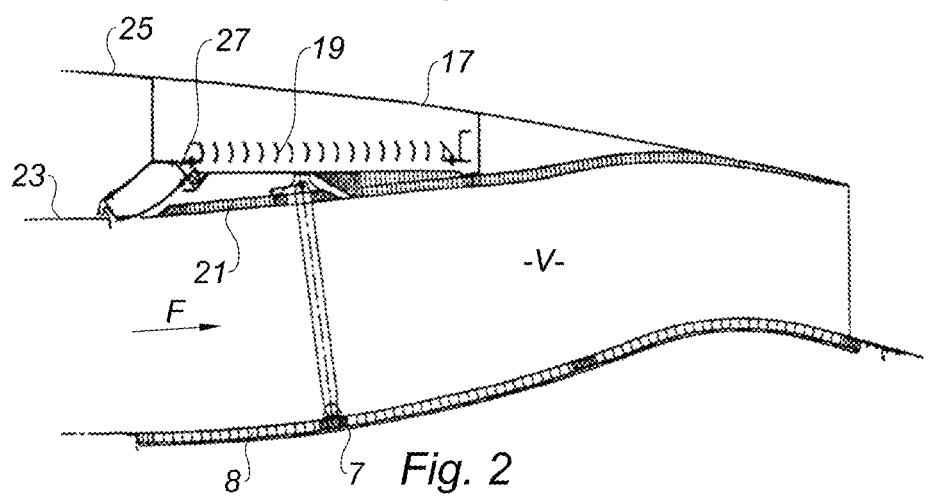
FIGS. 2 and 3 are longitudinal sectional views of a nacelle of the prior art provided with a thrust reverser device with fixed cascades, respectively illustrated in direct jet and reverse jet operation.
Figure 3:
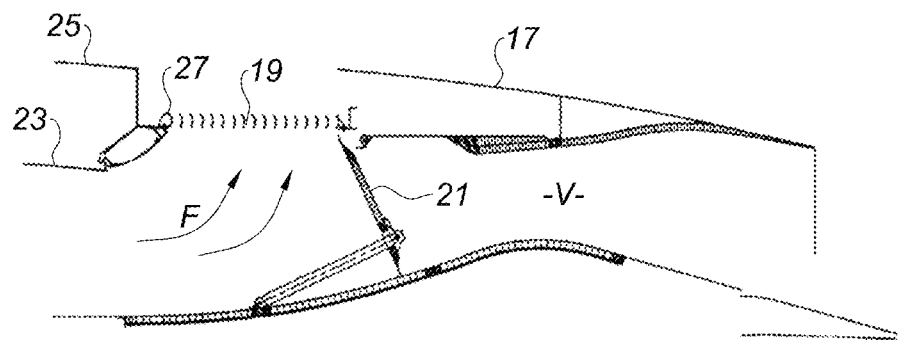

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that in the description and in the claims, the terms "upstream" and "downstream" must be understood with regards to the circulation of the air flow inside the propulsion unit formed by the nacelle and the turbojet engine, that is to say from left to right with reference to all figures.

Figure 6:
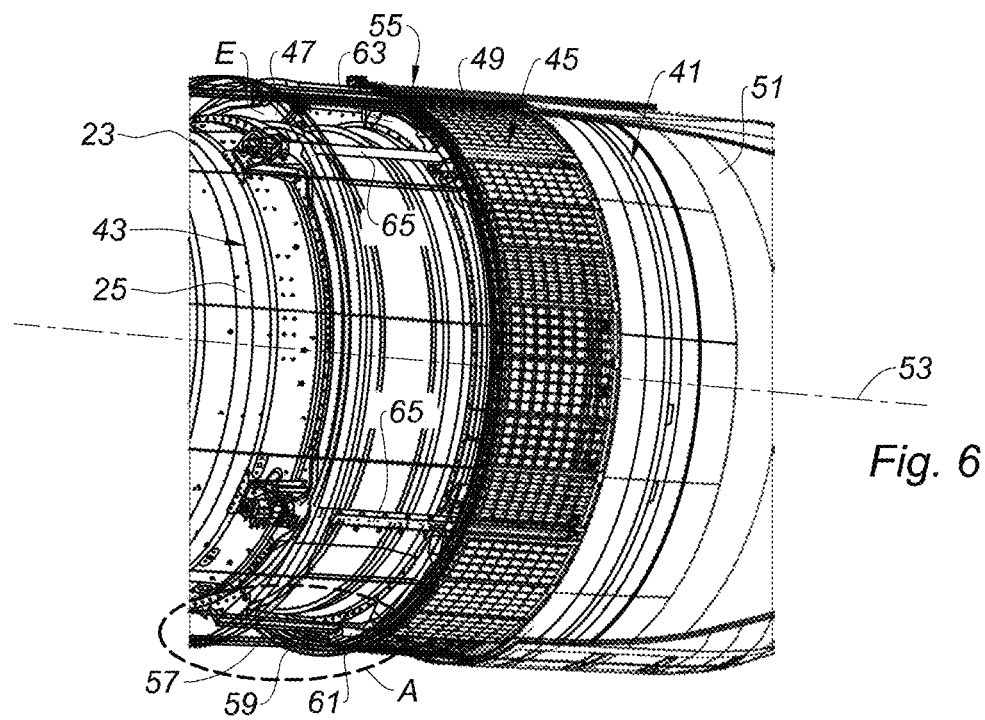
FIG. 6 illustrates a propulsion unit according to the teachings of the present disclosure, whose nacelle is provided with a thrust reverser device with translating cascades.

Referring to FIG. 6 in which there is represented a propulsion unit according to the teachings of the present disclosure, whose nacelle 41 is provided with a thrust reverser device with translating cascades illustrated in reverse jet operation.

Figure 4:
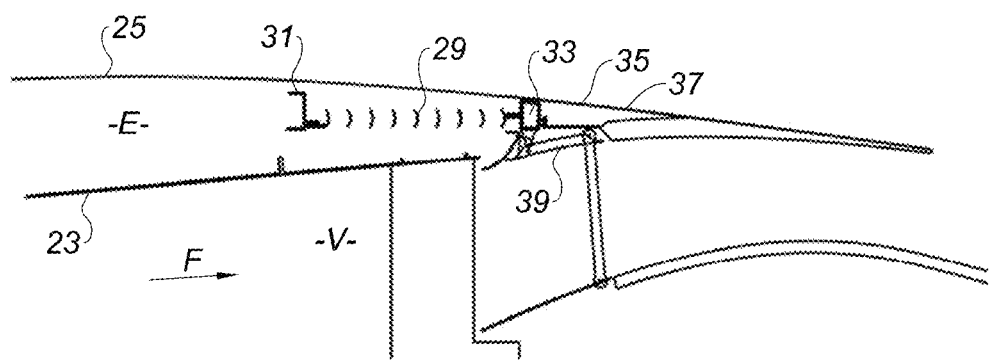
FIGS. 4 and 5 are longitudinal sectional views of a nacelle of the prior art provided with a thrust reverser device with translating cascades, respectively illustrated in direct jet and reverse jet operation.
Figure 5:
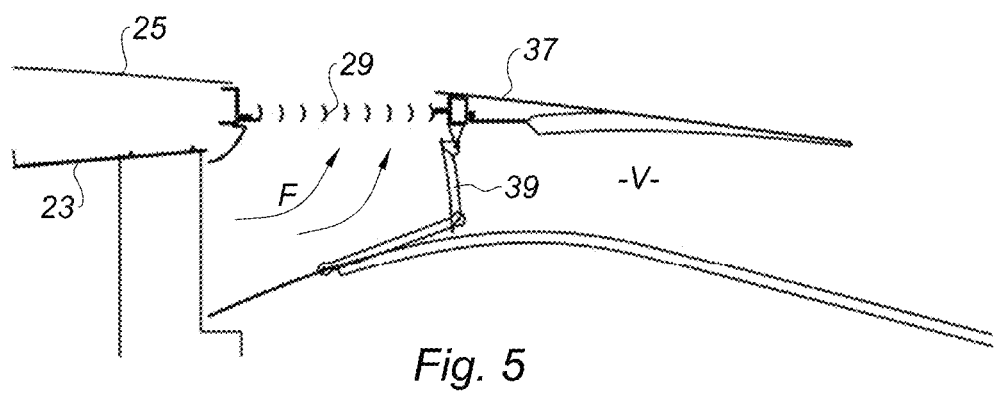

In accordance with the nacelle shown in FIGS. 4 and 5 of the prior art, the nacelle 41 of the present disclosure includes a fixed structure 43 and a movable structure 45.

As regards the fixed structure 43, this structure is fixed relative to the remainder of the nacelle 41. The fixed structure comprises a fan cowl 25 defining, together with the fan casing 23 of the turbojet engine, an annular space E forming an envelope 47.

As regards the movable structure 45, this structure is movable relative to the fixed structure 43 of the nacelle. The movable structure of the nacelle comprises a set of cascade vanes 49 and a thrust reverser cowl 51. An upstream edge of the thrust reverser cowl is secured to a rear frame of the set of cascades. Thus, a displacement of the thrust reverser cowl in the nacelle causes the concomitant displacement of the cascade vanes in the nacelle.

When the nacelle is in the direct jet operating mode (operating mode not represented in FIG. 6), the cascade vanes 49 are contained within the envelope 47 defined by the fan cowl and by the fan casing belonging to the turbojet engine. The thrust reverser cowl 51 and the cascade vanes 49 are located in a position called retracted position, in which the thrust reverser cowl 51 provides an aerodynamic continuity with the fan cowl 25 of the fixed structure 43 of the nacelle.

When the nacelle is in the reverse jet operating mode (operating mode represented in FIG. 6), the movable structure 45 has been translated along an axis 53 substantially parallel to a longitudinal axis of the nacelle. The thrust reverser cowl 51 and the cascade vanes 49 are in a position called deployed position, in which a passage in the nacelle is open. The cascade vanes 49 are downstream of the envelope 47 defined by the fan cowl 25 and the fan casing 23. The cascade vanes 49 thus become operational to enable a portion of an air flow passing through the flow path to escape from the nacelle and to be redirected upstream of the nacelle.

The displacement of the movable structure is provided according to a set of guiding systems.

To this end, the set of guiding systems includes an upper guiding system 55, positioned proximate to a mast intended to connect the nacelle to an aircraft wing and a lower guiding system 57, substantially diametrically opposite to the upper guiding system.

Both of the upper guiding system 55 and the lower guiding system 57 are fixed in the nacelle and thus belong to the fixed structure 43 of the nacelle.

The upper guiding system 55 includes two guiding rails (12 O'clock rail because of their position at the top of the nacelle). These guiding rails are for example profiled along the mast, on either side of the mast. These rails may also alternatively be disposed on an intermediate element secured to the mast when the propulsion unit is mounted.

In turn, the lower guiding system 57 includes one single guiding rail 59 (more visible in FIGS. 7 to 9), also called "6 O'clock rail" because of its position in the lower portion of the nacelle.

The movable structure 45 of the nacelle further includes a slide 61 (more visible in FIGS. 7 to 9) secured to a movable front frame 63 (more visible in FIGS. 7 to 9) supporting an upstream end of the cascade vanes 49. The slide 61 is designed to enable the displacement of the movable structure 45 along the lower guiding system 57.

In a known manner, the displacement of the movable structure between its retracted position and its deployed position is obtained thanks to the activation of a plurality of actuators 65 which may be of hydraulic, pneumatic or electric kind.

These actuators 65 are distributed over the circumference of the nacelle (only two actuators are shown in FIG. 6, but it should be understood that two other actuators are positioned on the circumference of the nacelle, symmetrically with the two represented actuators).

More specifically, two actuators 65 are disposed in an upper area of the nacelle, located proximate to the upper guiding system 55 and two actuators 65 are disposed in a lower area of the nacelle, located proximate to the lower guiding system 57.

According to the present disclosure, the nacelle includes one or several position sensor(s) designed and arranged in the nacelle to detect a deformation of the movable structure exceeding an authorized predetermined deformation threshold.

Unlike some position sensors used in the nacelles of the prior art to track the displacement of the actuators of the thrust reverser device, the present disclosure a position sensor is configured, not to measure the displacement of the actuators, but to detect a deformation of the movable structure exceeding an authorized predetermined deformation threshold.

The position sensor of the present disclosure comprises a detector, secured to the fixed structure of the nacelle, and a target, secured to the movable structure of the nacelle, the position sensor being configured to send a signal to an external device when the target substantially faces the detector.

Figure 7:
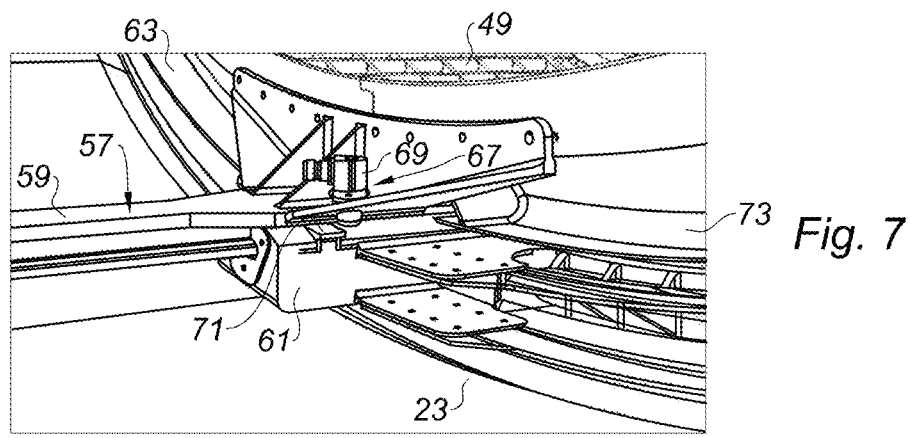
FIG. 7 is an enlarged view of the area A of FIG. 6, the nacelle according to a first form of the present disclosure.

According to a first form of the present disclosure, illustrated in FIG. 7 obtained by enlarging the area A of FIG. 6, a position sensor used in the context of the present disclosure is a proximity sensor 67.

The proximity sensor 67 includes a detector 69 secured to the fixed structure of the nacelle and includes a target 71 secured to the movable structure of the nacelle.

The detector 69 of the proximity sensor 67 is mounted on the guiding rail 59 of the lower guiding system 57. In one aspect, the detector is mounted proximate to a deflection edge 73, fixed relative to the nacelle, ensuring an aerodynamic line with a downstream portion of the fan casing 23 of the turbojet engine.

In turn, the target 71 is preferably mounted on the slide 61.

The detector 69 emits a magnetic field, and the target 71 is adapted to change the state of this magnetic field when it substantially faces the detector 69.

Figure 8:
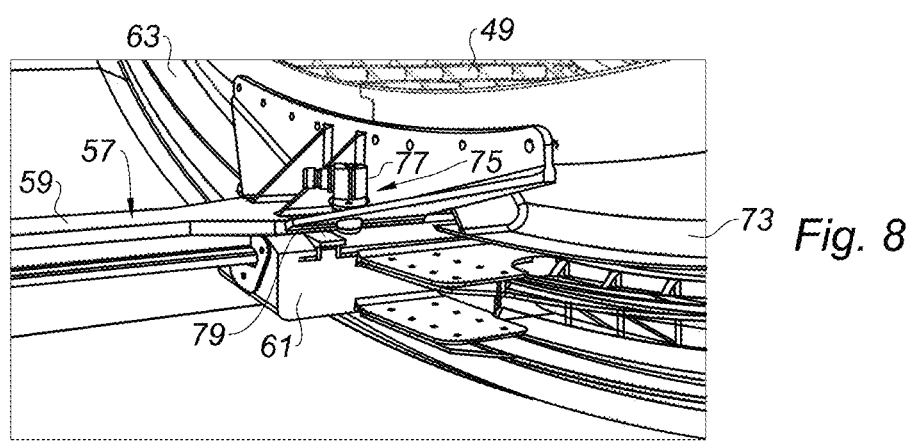
FIG. 8 is an enlarged view of the area A of FIG. 6, the nacelle according to a second form of the present disclosure.

According to a second form of the present disclosure, illustrated in FIG. 8 obtained by enlarging the area A of FIG. 6, a position sensor used in the context of the present disclosure is an optical sensor 75.

The optical sensor 75 includes a detector 77 secured to the fixed structure of the nacelle and includes a target 79 secured to the movable structure of the nacelle.

As for the detector 69 of the proximity sensor 67, the detector 77 of the optical sensor 75 is mounted on the guiding rail 59 of the lower guiding system 57. In some aspects, the detector is mounted proximate to the deflection edge 73. The target 79 is also preferably mounted on the slide 61.

The detector 77 emits a luminous flux, for example via a set of diodes or lasers, and the target 79 includes a reflector for reflecting the luminous flux, such as a mirror, configured to reflect the luminous flux emitted by the detector when the target 79 substantially faces the detector 77.

Figure 9:
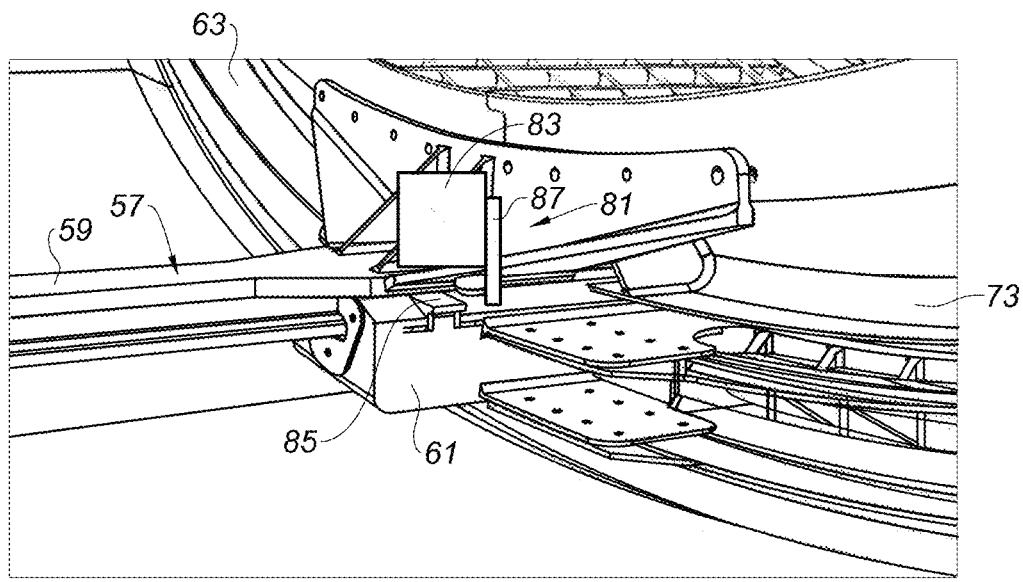
FIG. 9 is an enlarged view of the area A of FIG. 6, the nacelle according to a third form of the present disclosure.

According to a third form of the present disclosure, illustrated in FIG. 9 obtained by enlarging the area A of FIG. 6, a position sensor used in the context of the present disclosure is an electromechanical sensor 81.

The electromechanical sensor includes a detector 83 secured to the fixed structure of the nacelle and includes a target 85 secured to the movable structure of the nacelle.

As for the proximity sensor 67 and for the optical sensor 75, the detector 83 of the electromechanical sensor 81 is mounted on the guiding rail 59 of the lower guiding system 57. In some aspects, the detector is mounted proximate to the deflection edge 73. In turn, the target 85 is preferably mounted on the slide 61.

The detector 83 of the electromechanical sensor 81 comprises a contact lever 87, which can be actuated by the target when the target 85 substantially faces the detector 83.

Figure 10:
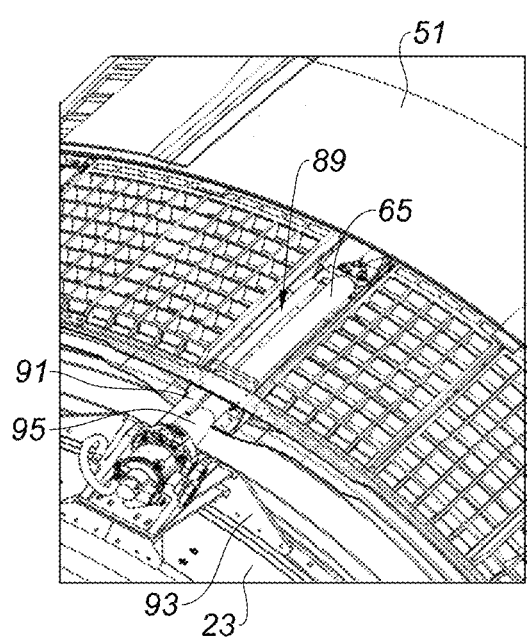
FIGS. 10 and 11 show the nacelle according to a fourth form, respectively illustrated in direct jet and reverse jet operation.
Figure 11:
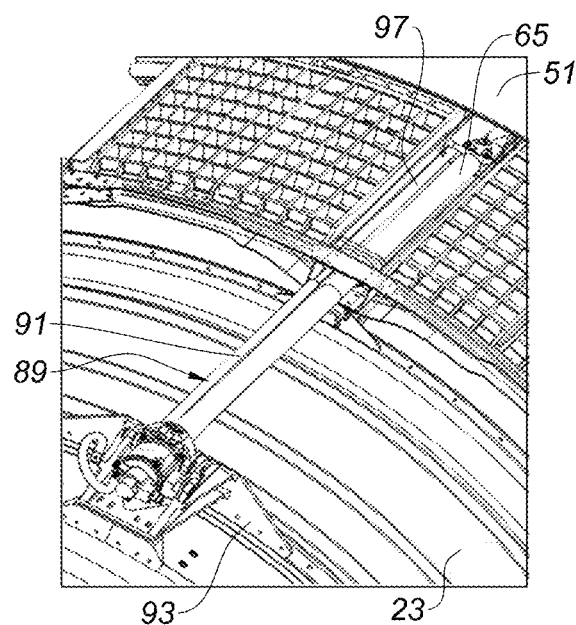

According to a fourth form represented in FIGS. 10 and 11, in which there is represented the nacelle of FIGS. 6 to 9, respectively according to a direct jet and reverse jet operating mode, the fan cowl having been obscured for a better understanding, a position sensor used in the context of the present disclosure may be a linear position sensor 89 of the "LVDT" (Linear variable Differential Transformer type known to those skilled in the art, or a magnetostrictive sensor or the like.

According to the present disclosure, the LVDT linear position sensor 89 is positioned proximate to at least one of the actuators 65, which allows detecting any event on the actuators or on the movable structure.

The linear position sensor 89 includes a fixed body 91 mounted on a fitting 93 fastened on the fan casing 23, a fitting to which a fixed body 95 of the actuator 65 is attached, and a movable body 97, which is telescopic relative to said fixed body 91, attached to the movable structure of the nacelle, for example to the thrust reverser cowl 51 of the movable structure.

Advantageously, the LVDT linear position sensor 89 is positioned proximate to each actuator of the thrust reverser device, this in order to finely detect the events occurring on the actuators or on the areas of the movable structure proximate to the actuators.

Figure 12:
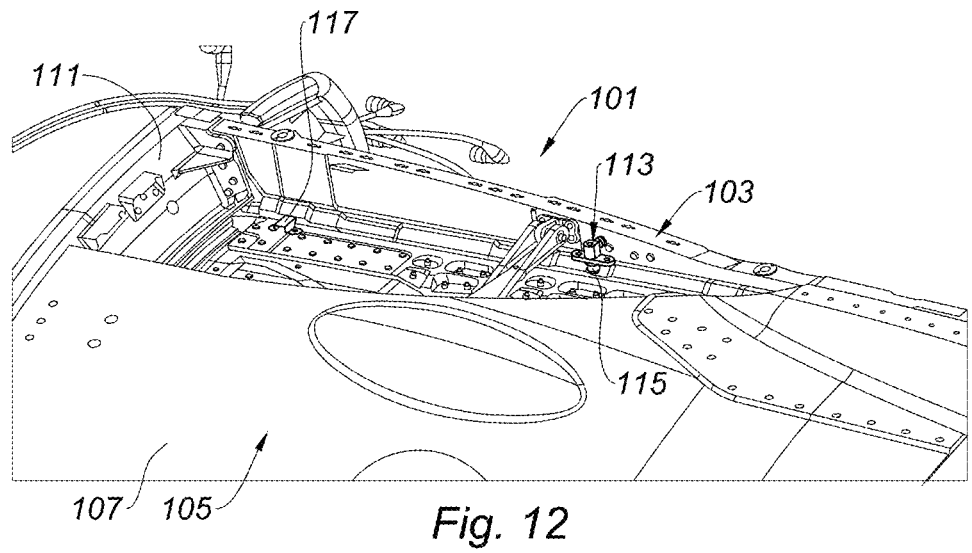
FIGS. 12 and 13 represent a nacelle according to the teachings of the present disclosure, provided with a thrust reverser device with fixed cascades, respectively illustrated in direct jet and reverse jet operation.
Figure 13:
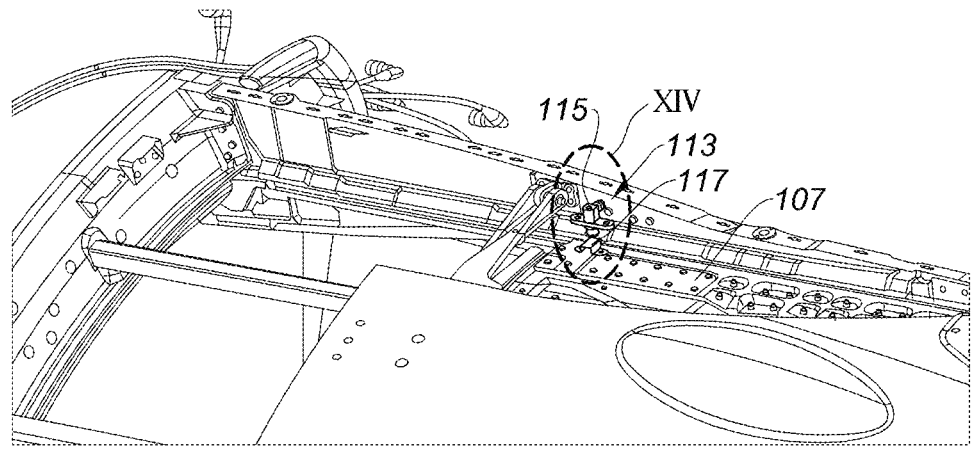
Figure 14:
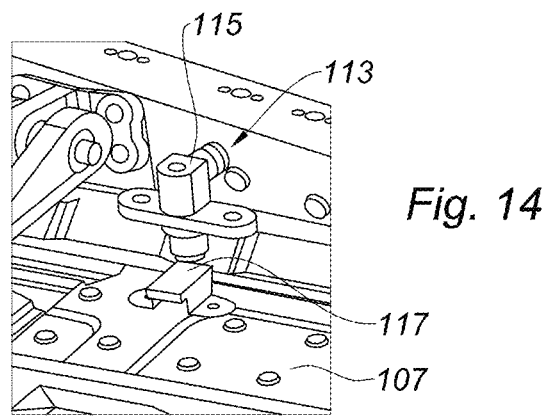
FIG. 14 is an enlargement of the area XIV of FIG. 13.

According to a variant represented in FIGS. 12 to 14, the nacelle can be provided with a thrust reverser device with fixed cascades.

Referring to FIG. 12 in which there is represented a propulsion unit in direct jet operation according to the present disclosure, whose nacelle 101 is provided with a thrust reverser device with fixed cascades.

The nacelle 101 of the present disclosure includes a fixed structure 103 and a movable structure 105.

As regards the fixed structure 103, this structure is fixed relative to the remainder of the nacelle 101. The fixed structure comprises a fan cowl (not shown herein).

As regards the movable structure 105, this structure is movable relative to the fixed structure 103 of the nacelle. The movable structure of the nacelle comprises a thrust reverser cowl 107.

When the nacelle is in the direct jet operating mode (operating mode represented in FIG. 12), the thrust reverser cowl 107 (whose representation is a cut-away view in FIGS. 12 and 13) is in the retracted position in which it provides an aerodynamic continuity with the fan cowl and covers cascade vanes (not represented herein for a good clarity of the figure). The cascade vanes are attached to the fan casing (not represented) of the turbojet engine and to a fan cowl (not represented), using a fixed front frame 111.

When the nacelle is in the reverse jet operating mode (represented in FIG. 13), the thrust reverser cowl 107 has been translated along the axis 53 (shown in FIG. 6) substantially parallel to a longitudinal axis of the nacelle. The thrust reverser cowl 107 is in a deployment position in which a passage in the nacelle is open. The cascade vanes are then uncovered and thus become operational to enable a portion of an air flow passing through the flow path to escape from the nacelle and be redirected upstream of the nacelle.

The displacement of the movable structure is provided by the set of upper and lower guiding systems in accordance with the upper 55 and lower 57 guiding systems discussed with reference to FIGS. 6 to 9 when the nacelle is equipped with a thrust reverser device with translating cascades and belonging to the fixed structure 103 of the nacelle.

According to the present disclosure, the nacelle includes one or several position sensor(s) 113 designed and arranged in the nacelle to detect a deformation of the movable structure exceeding an authorized predetermined deformation threshold.

As illustrated in FIG. 12, the position sensor 113 comprises a detector 115, secured to the fixed structure of the nacelle, and a target 117, secured to the thrust reverser cowl 107.

In some aspects of the present disclosure, the detector 115 is mounted on the upper guiding rail. In turn, the target 117 is directly mounted on the thrust reverser cowl 107.

The position sensor is designed to send a signal to an external device when the target 117 substantially faces the detector 115, as represented in FIGS. 13 and 14 illustrating the nacelle in a reverse jet operating mode.

The sensors used when the nacelle is equipped with a thrust reverser device with translating cascades are also proximity sensors, optical sensors or electromechanical sensors in accordance with those discussed with reference to FIGS. 6 to 9.

According to a variant common to all forms described with reference to FIGS. 6 to 14, one or several end-of-travel stop(s) can equip one or several guiding rail(s) of the set of systems for guiding in translation the movable structure, this in order to limit the stroke of the movable structure, thus limiting the associated stresses.

Of course, the present disclosure is not limited to the only forms of this nacelle, described hereinabove only as illustrating examples, but it encompasses, on the contrary, all variants involving the technical equivalents as well as the combinations thereof if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A nacelle for an aircraft turbojet engine with a thrust reverser device, the nacelle comprising:
    a fixed structure;
    a movable structure displaceable in translation along an axis substantially parallel to a longitudinal axis of the nacelle between a retracted position in which an aerodynamic continuity with the fixed structure of the nacelle during a direct jet operation of the nacelle is provided and a deployed position in which a passage intended for circulation of a secondary air flow diverted during a reverse jet operation of the nacelle is provided; and
    at least one position sensor configured and arranged in the nacelle to detect a deformation of the movable structure exceeding a predetermined authorized deformation threshold, wherein the at least one position sensor comprises a detector secured to the fixed structure of the nacelle and a target secured to the movable structure of the nacelle, the at least one position sensor being configured to send a signal to an external device when the target substantially faces the detector,
    wherein the fixed structure comprises an upper guiding system for guiding the movable structure and positioned proximate to a mast configured to connect the nacelle to an aircraft wing, and a lower guiding system for guiding the movable structure substantially diametrically opposite to the upper guiding system,
    wherein the movable structure comprises a set of cascade vanes contained within an envelope defined by a fan cowl and by a fan casing of the turbojet engine during the direct jet operation of the nacelle, a thrust reverser cowl secured to the set of cascade vanes, and a slide configured to displace the movable structure along the lower guiding system, and
    wherein the detector of the at least one position sensor is mounted on at least one of the upper guiding system and the lower guiding system, and the target is mounted on the slide.

2. The nacelle according to claim 1, wherein the at least one position sensor is a proximity sensor with the detector secured to the fixed structure of the nacelle and the target secured to the movable structure of the nacelle, the at least one position sensor is configured to change a state of a magnetic field emitted by the detector when the target substantially faces the detector.

3. The nacelle according to claim 1, wherein the at least one position sensor is an optical sensor with the detector secured to the fixed structure of the nacelle and configured to emit a luminous flux and the target secured to the movable structure of the nacelle and configured to reflect the luminous flux.

4. The nacelle according to claim 1, wherein the at least one position sensor is an electromechanical sensor with the detector secured to the fixed structure of the nacelle and comprising a contact lever and the target secured to the movable structure of the nacelle and configured to actuate the contact lever when the target substantially faces the detector.

5. The nacelle according to claim 1, wherein the fixed structure further comprises a deflection edge providing an aerodynamic line with a downstream portion of the fan casing of the turbojet engine, wherein the detector of the at least one position sensor is mounted proximate to the deflection edge.

6. The nacelle according claim 1, wherein the upper guiding system comprises two profiled guiding rails along the mast and the lower guiding system comprises one single guiding rail, and the detector is on each rail of the upper guiding system and another detector is on the rail of the lower guiding system.

7. The nacelle according to claim 1, wherein the fixed structure comprises
    a plurality of actuators, and
    wherein the plurality of actuators are configured to displace the movable structure during an activation thereof, wherein the at least one position sensor includes a linear position sensor of a linear-variable-differential-transformer type positioned proximate to at least one of the plurality of actuators.

8. The nacelle according to claim 7, wherein the linear position sensor is positioned proximate to each of the plurality of actuators.

9. The nacelle according to claim 1, further comprising at least one end-of-travel stop mounted on at least one of the upper guiding system and the lower guiding system for guiding the movable structure.

10. A nacelle for an aircraft turbojet engine with a thrust reverser device, the nacelle comprising:
    a fixed structure;
    a movable structure displaceable in translation along an axis substantially parallel to a longitudinal axis of the nacelle between a retracted position in which an aerodynamic continuity with the fixed structure of the nacelle during a direct jet operation of the nacelle is provided and a deployed position in which a passage intended for circulation of a secondary air flow diverted during a reverse jet operation of the nacelle is provided; and at least one position sensor configured and arranged in the nacelle to detect a deformation of the movable structure exceeding a predetermined authorized deformation threshold, wherein the at least one position sensor comprises a detector secured to the fixed structure of the nacelle, and a target secured to the movable structure of the nacelle, the at least one position sensor being configured to send a signal to an external device when the target substantially faces the detector, wherein the fixed structure comprises:
- an upper guiding system for guiding the movable structure and positioned proximate to a mast configured to connect the nacelle to an aircraft wing, and
- a lower guiding system for guiding the movable structure substantially diametrically opposite to the upper guiding system, wherein the movable structure comprises a thrust reverser cowl displaceable in translation along an axis substantially parallel to a longitudinal axis of the nacelle between a retracted position in which an aerodynamic continuity with the fixed structure of the nacelle during the direct jet operation of the nacelle is provided and a deployed position in which a passage intended for the circulation of a secondary air flow diverted during a reverse jet operation of the nacelle is provided, and wherein the detector of the at least one position sensor is mounted on at least one of the upper guiding system and the lower guiding system, and the target is mounted on the thrust reverser cowl proximate to an upstream edge of the thrust reverser cowl.

11. The nacelle according to claim 10, wherein the at least one position sensor is a proximity sensor with the detector secured to the fixed structure of the nacelle and the target secured to the movable structure of the nacelle, the at least one position sensor is configured to change a state of a magnetic field emitted by the detector when the target substantially faces the detector.

12. The nacelle according to claim 10, wherein the at least one position sensor is an optical sensor with the detector secured to the fixed structure of the nacelle and configured to emit a luminous flux and the target secured to the movable structure of the nacelle and configured to reflect the luminous flux.

13. The nacelle according to claim 10, wherein the at least one position sensor is an electromechanical sensor with the detector secured to the fixed structure of the nacelle and comprising a contact lever and the target secured to the movable structure of the nacelle and configured to actuate the contact lever when the target substantially faces the detector.

14. The nacelle according to claim 10, wherein the fixed structure further comprises a deflection edge providing an aerodynamic line with a downstream portion of a fan casing of the turbojet engine, wherein the detector of the at least one position sensor is mounted proximate to the deflection edge.

15. The nacelle according claim 10, wherein the upper guiding system comprises two profiled guiding rails along the mast and the lower guiding system comprises one single guiding rail, and the detector is on each rail of the upper guiding system and another detector is on the rail of the lower guiding system.

16. The nacelle according to claim 10, wherein the fixed structure comprises a plurality of actuators, and wherein the plurality of actuators are configured to displace the movable structure during an activation thereof, wherein the at least one position sensor includes a linear position sensor of a linear-variable-differential-transformer type positioned proximate to at least one of the plurality of actuators.

17. The nacelle according to claim 16, wherein the linear position sensor is positioned proximate to each of the plurality of actuators.

18. The nacelle according to claim 10, further comprising at least one end-of-travel stop mounted on at least one of the upper guiding system and the lower guiding system for guiding the movable structure.

* * * * *